United States Patent [19]

Ioka

[11] Patent Number: 5,038,027
[45] Date of Patent: Aug. 6, 1991

[54] CONTACT READING IMAGE SENSOR WITH A ROD LENS ARRAY

[75] Inventor: Akio Ioka, Amagasaki, Japan

[73] Assignee: Mitsubishi Denki Kabushiki Kaisha, Tokyo, Japan

[21] Appl. No.: 509,226

[22] Filed: Apr. 16, 1990

[30] Foreign Application Priority Data

Apr. 19, 1989 [JP] Japan .................. 1-100926

[51] Int. Cl.$^5$ ............................................. H01J 40/14
[52] U.S. Cl. ......................... 250/208.1; 358/484
[58] Field of Search ............... 250/208.1, 239, 227.2; 358/213.1, 484; 350/96.18, 96.31, 413; 355/1

[56] References Cited

U.S. PATENT DOCUMENTS

| | | | |
|---|---|---|---|
| 3,658,407 | 4/1972 | Kitano et al. | 355/1 |
| 3,977,777 | 8/1976 | Tanaka et al. | 355/1 |
| 4,331,380 | 5/1982 | Rees et al. | 350/96.31 |
| 4,623,937 | 11/1986 | Watanabe | 250/208.1 |
| 4,682,042 | 7/1987 | Igarashi | 250/208.1 |

OTHER PUBLICATIONS

O plus E, pp. 117 to 121, Application of Micro-Optics to Facsimile, Komiya, Jan. 1984.
O plus E, pp. 67 to 73, Graded-Index Rod Lens of Low Aberration Yamagishi, Jan. 1984.
Nihon Itagarasu K. K. Technical Papers: Selfoc Lens Array, Oct. 1987.

Primary Examiner—David C. Nelms

[57] ABSTRACT

An image sensor includes a rod lens array. The rod lens array includes a plurality of rod lenses which are placed within a frame. The frame has an engagement part to secure it to a housing of the image sensor. The engagement part can be a groove in the frame which is secured to the housing by a ridge in the housing. In an alternative, the engagement part can be flanges on the frame which are engaged with shoulders in the housing. No adjusting mechanism for the array such as an adjustment screw, is needed.

15 Claims, 5 Drawing Sheets

REFRACTION INDEX DISTRIBUTION

CONTACT READING IMAGE SENSOR WITH A ROD LENS ARRAY

BACKGROUND OF THE INVENTION

The present invention relates to an image sensor used for example in an image reader.

FIG. 5 illustrates a conventional contact-type image sensor shown for example in Mitsubishi Denki Technical Journal. Vol. 60, No. 11, 1986.

As illustrated in FIG. 5, a linear light source 54 uniformly illuminates an original document 51 which is guided by an original document guide 52. A rod lens array 55 receives light reflected from the original document 51. The rod lens array 55 consists of a plurality of rod lenses and serves for formation of an erect image with one-to-one ratio. Light passing through the rod lens array 55 is focused on a linear sensor board 56 which includes an array of photodetectors, not shown. The light is converted by the photodetectors into electrical signals, and outputted to an external circuit, not shown. The linear sensor board 56 has the same width (dimension orthogonal to the direction of the relative movement of the original document 1 relative to the image reader). The linear light source 54 and the rod lens array 55 are accommodated in a housing 53.

FIG. 6A and FIG. 6B show another conventional contact-type image sensor shown in the Mitsubishi Denki Contact-type Image Sensor Catalogue (February 1989).

In this prior art image sensor, the original 51 is passed over a glass sheet 57, which is fixed to the housing 53 by means of side boards 59, only one of them being shown in FIG. 6B which is a sectional view of the rod lens array 55 as seen along the line 6B—6B in FIG. 6A. The side boards 59 are fixed by means of screws 60. The rod lens array 55 is supported by lens holder 58 in such a manner that its position along the direction of the light path can be adjusted. For this adjustment, a set screw 61 is turned, and a gap D is provided to allow the movement relative to the housing 53 for the position adjustment.

Light reflected from the original is passed through the rod lens array 55, focused to form an image on an array of photodetectors which are part of the linear sensor board. and converted into electrical signals representing the density or brightness at each area or pixels of the original document 1.

The electrical signals are transmitted to a signal detector, not illustrated, and electrical signals are thus obtained.

Used for the rod lens array, are Selfoc (trademark) supplied by Nihon Itagarasu K.K. FIG. 7 is a part of a explanatory diagram contained in the publication Nihon Itagarasu K.K. Technical Papers (SELFOC LENS ARRAY. printed in October 1987). The rod lenses 62 in FIG. 7A are made of glass which is a solid dielectric material. It has a distribution of the refraction index decreasing (graded) with the radial distance from the central axis as shown on the right side of FIG. 7A. Such light proceeds following a curved path with a certain pitch. The functional equivalent to that of a lens is thereby attained. The distribution of the refraction index is approximately given by the following relationship:

$$n(r) = n_0 \left(1 - \frac{A}{2} r^2\right) \quad (1)$$

where
- $n_0$ represents the refraction index at the central axis.
- $r$ represents the refraction index gradation coefficient, and
- $r$ represents the distance in the radial direction from the central axis.

FIG. 7B shows the structure of the rod lens array 55. The diameter of the rod lens 62 is normally about 1 mm and the range in which image is formed (radius of the field of vision) is about several mm. To obtain an image of a wide range, a multiplicity of lenses have to be used. As illustrated in FIG. 7B a multiplicity of lenses are arranged linearly in a frame 63 made of a glass epoxy resin having substantially the same thermal expansion characteristics as the lenses, and the interstices are filled with black rubber like silicone resin 64.

Conventional rod lenses 62 are made of glass, and to give them the refraction index gradation, wet ion exchange is conducted after spinning. The wet ion exchange however takes several days, and the process takes a long time. Because the process is of a wet type it is difficult to reduce the manufacture fluctuation in the refraction index gradation coefficient. $\sqrt{A}$. As a result, the cost is high, and there is a fluctuation in the refraction index gradation coefficient, particularly between production batches. Consequently, the height $Z_0$ of the rod lens array 55 had to be varied from one batch to another to obtain a constant conjugate length TC. With the type having an angular aperture of 20 degrees, which are most widely used, the range of the fluctuation is from +0.3 to +0.6 mm. Accordingly, conventional image sensors employing the conventional rod lens array is provided with the lens holder 58 and the set screw 61 for fine positioning of the rod lens array 55. The fine positioning of the rod lens array 55 in the direction of the optical axis is achieved by the rotation of the set screw 61 and the resiliency of the nails 58a of the lens holder 58 see FIG. 6B. Thus, the number of the parts required is large, and the work of the fine positioning is time consuming.

SUMMARY OF THE INVENTION

The invention has been made to solve the above problem. It aims at providing an image sensor in which a resinous rod lenses are used in place of the glass rod lenses. The process for the fabrication of the lenses is shorter than glass rocks, and the adjustment is simplified. This results in less expense, and the lenses have a smaller fluctuation in the refraction index gradation coefficient.

An image sensor according to the invention comprises:

a rod lens array comprising a plurality of resinous rod lenses arranged in one or more rows and extending in parallel with each other, and disposed within a frame;

a linear light source operatively connected to said lenses to transmit light thereto;

a housing accommodating the rod lens array and the linear light source:

wherein with respect to the lens array the following relationships are satisfied:

$$n(r) = n_0(1) A r^2)$$

$$0.14 \; rad. \leq n_0 r\sqrt{0.42} \; rad.$$

$$0.8 \; mm \leq 2r \leq 1.3 \; mm$$

where r represents the distance from the central axis.

n(r) represents the index of refraction at a location separated by r from the central axis $n_0$ represents the index of refraction at the central axis and $\sqrt{A}$ represents the refraction index gradation coefficient.

The frame and the housing may integrally formed of a synthetic resin. In addition the frame and the housing may have engagement parts by means of which the frame and the housing are engaged with each other.

In the image sensor of this invention, the rod lenses are formed by polymerization of resin, so that the process as compared to the prior art is shorter, and is therefore less expensive. The control over the refraction index coefficient of the lens is also easier, and the fluctuation of the refraction index coefficient is reduced. Moreover, where the frame and the housing are integrally formed with resin, the mechanism for the fine positioning of the rod lens array is not required, nor is an operation for such positioning required.

DETAILED DESCRIPTION OF THE PREFERRED EMBODIMENTS

Figure 1:
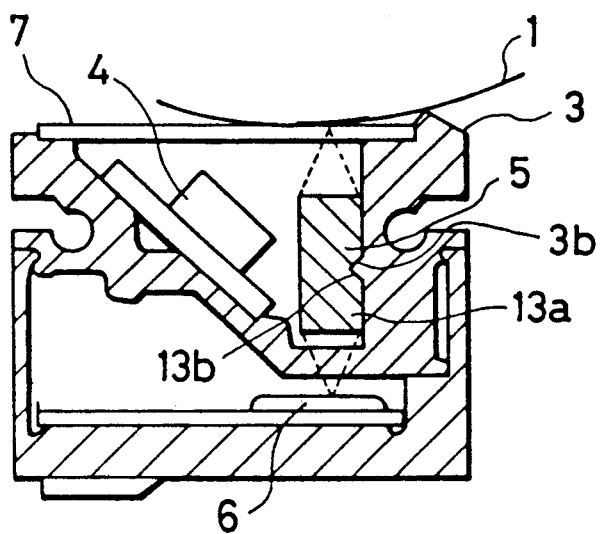
FIG. 1 is a cross sectional view of an image sensor of an embodiment of the invention.

An embodiment of the invention will now be described with reference to FIG. 1 and FIG. 2. As illustrated, an image sensor of this embodiment comprises a linear light source 4 formed of a row of light-emitting diodes for uniformly illuminating an original document 1 placed on or passed over a glass sheet 7. A rod lens array 5 consists of a plurality of resinous rod lenses 12 arranged in one or more rows and extending parallel with each other, and disposed within a frame 13. A multiplicity of lenses are arranged linearly in the frame 18, and the interstices between the lenses are filled with a rubber-like adhesive such as resin 14. The rod lens array 5 serves for formation of an erect image with one-to-one ratio on a linear sensor board 6 including a row of photodetectors, not illustrated as such. The linear sensor board 6 converts the light image focused thereon into electrical signals, which are then transmitted to a signal detector not shown. The linear light source 4 and the rod lens array 5 are accommodated in a housing 3.

However in the embodiment illustrated in FIG. 1 the frame 13 is provided with an engagement part 13b in the form of a groove, and the housing 3 is provided with an engagement part 3b in the form of a ridge. The frame 13 and the housing 3 are engaged with each other by the engagement parts 3b and 13b.

The rod lenses 12 forming the rod lens array 5 are fabricated from two or more polymerizing monomers having different polymerization rate, and different refraction indices after the polymerization, and has a refraction index n(r) given by the equation (1). The principle and the method of the manufacture will now be described.

When polymerizing monomers A and B having different chemical structures are co-polymerized, the composition of the resultant copolymer C will be:

$$\frac{dm1}{dm2} = \frac{M1 \; (r1M1 + M2)}{M2 \; (r2M2 + M1)} \quad (2)$$

as is described in POLYMER Handbook, 2nd Ed., J. Brandrup, E.H. Immergut, Editors, Wiley-New York, 1975, L.J. Young.

In the above formula, m1 and m2 represent the number of moles of the components A and B in the copolymer C. and M1 and M2 represent the number of moles of the monomers A and B, r1 and r2 represent reactivity constants of the monomers A and B in the mixture system. The values of r1 and r2 are given for various mixture systems of polymerizing monomers on pages II - 105 to 386 of the above mentioned POLYMER HANDBOOK.

According to the above mentioned POLYMER HANDBOOK, L. Bobn, the refraction index nAB of a copolymer is given by the following equation:

$$nAB = CAnA + (1-CA)nB \quad (3)$$

where nA and nB are refraction indices of the polymers A and B by themselves, and CA {=m1/(m1+m2)} is the mole ratio of the component A in the copolymer C. The values of nA and nB are given on pages III - 241 to 244 in the above mentioned POLYMER HANDBOOK.

In the present invention, to obtain the refraction index $n_0$ at the central axis and refraction index gradation coefficient $\sqrt{A}$, the polymerizing monomers are selected from the compounds shown in each section (II - 105 to 386 pages, and III - 241 to 244 pages) of the above mentioned POLYMER HANDBOOK. For the co-polymerization, one of the following methods can for example be employed.

(1) The method of thermal polymerization or microwave-thermal polymerization with a small amount of thermal polymerization initiator being added.

(2) Photo-polymerization with a photo-polymerization initiator being added, or radiation polymerization without any initiator.

During the fabrication of rod lenses 12, the polymerization reaction proceeds from the central axis in the method (1) above, while the polymerization reaction proceeds from the periphery in the method (2) above. The method of polymerization should therefore be selected taking account of the reaction characteristics and the refraction index of the material used.

For instance, when styrene and ethyl methacrylate are selected, r1 and r2 are 0.53 and 0.41, respectively, at 60° C., and nA and nH are 1.59 and 1.485, respectively, and hence nA>nB, so the method (1) above should be used. On the other hand, if methyl methacrylate and methyl cinnamate are selected, r1 and r2 are 3.8 and 0, respectively, at 70° C. and nA and nB are 1.49 and 1.57, respectively, and nB >nA, so the method (2) above should be used.

The rod lens 12 fabricated in the manner described above has its optical characteristics well controlled, and conditions shown by the relationship (4) and (5) are satisfied with high precision:

$$0.14 \, rad. \leq n_0 r\sqrt{A} \leq 0.42 \, rad. \tag{4}$$

$$0.8 \, mm \leq 2r \leq 1.3 \, mm \tag{5}$$

where r (mm) represents the rod radius of the rod lens 12.

$n_0$ represent the refraction index of the rod lens on the central axis, and $\sqrt{A}$ (mm$^{-1}$) represents the refraction index gradation coefficient.

Figure 2:
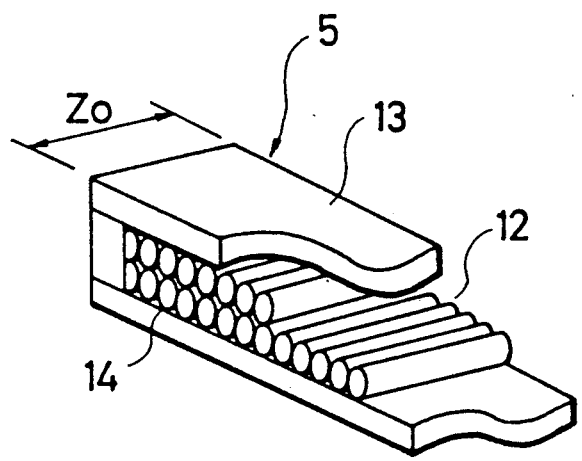
FIG. 2 is a diagram showing the configuration of the rod lens array.

With the rod lens 12 fabricated in this way, a rod lens array 5 shown in FIG. 2 is formed in the same way as the above described conventional example. In the example of FIG. 2, the rod lens array comprises two rows. But it may alternatively consists of a single row.

Figure 6A:
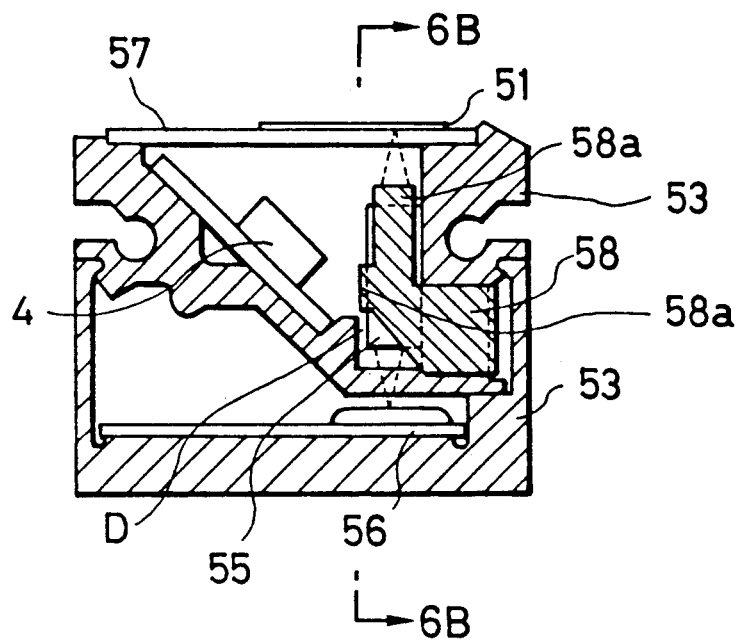
FIG. 6A is a sectional view of the conventional image sensor.
Figure 6B:
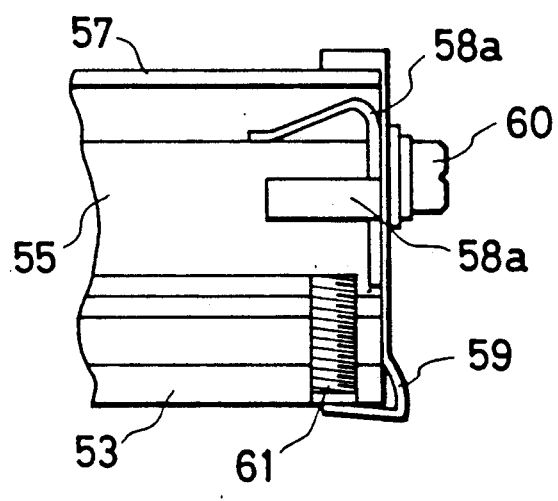
FIG. 6B is a sectional view of the rod lens array along line 6B—6B in FIG. 6A.
Figure 7A:
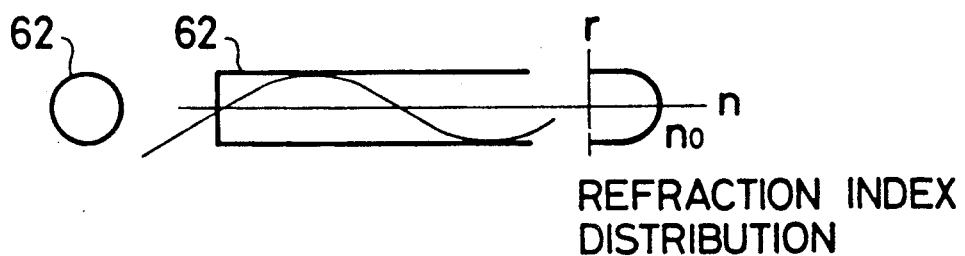
FIGS. 7A and 7B are diagrams showing the characteristics and configuration of the conventional rod lens array.
Figure 7B:
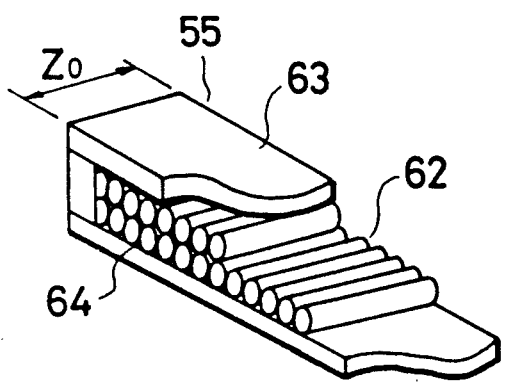
Figure 8:
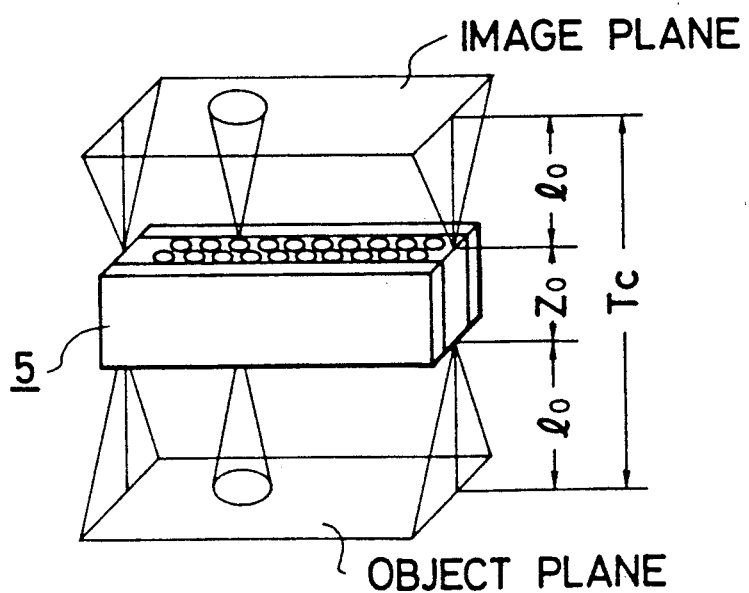
FIG. 8 is a diagram schematically illustrating the lens optical system.

In the conventional rod lens array 5 made of glass, the fine positioning mechanism as shown in FIG. 6A and FIG. 6B was necessary. In contrast, in the present invention, resinous rod lens array 5 fabricated by photopolymerization. thermal polymerization or the like of monomers having different refraction indices and different polymerization rates, so that the refraction index gradation coefficient $\sqrt{A}$ which is unequivocally determined by the equations (4) and (5) is obtained, and no fine positioning mechanism is therefore required.

That is, the following relationships hold between the pitch of curved path of light within the lens, P, the conjugate length TC, and the length of the lens which is typical of those used in practice, $Z_0$:

$$P = \frac{2\pi}{\sqrt{A}} \tag{6}$$

$$TC = Z_0 - \frac{2}{n_0 \sqrt{A}} \tan\left(\frac{Z_0 \pi}{P}\right) \tag{7}$$

$$\frac{\pi}{\sqrt{A}} < Z_0 \leq \frac{2\pi}{\sqrt{A}} \tag{8}$$

It is possible to design a rod lens array 5 having the the desired conjugate length TC and rod lens height $Z_0$ within the range in which the relationships (1) to (8) are satisfied, on the basis of the refraction index gradation coefficient $\sqrt{A}$ of a certain fixed value. The fact that the lens height $Z_0$ can be maintained unchanged for the given conjugate length TC means that the fine positioning mechanism described above can be eliminated. Assembly is therefore simplified.

This embodiment is described with reference to FIG. 1. The engagement part 8b is provided on the mounting surface of the housing 3, and is in the form of a ridge. A engagement part 13b in the form of a groove is formed on the frame 13 of the rod lens array 5. The engagement parts 13b engages with the engagement part 3b to hold the rod lens array 5 in position. The engagement parts 3b and 13b are provided to position the rod lens array to give the best image formation.

Another embodiment is described with reference to FIG. 3. Engagement parts 5c1 and 5c2 in the form of flanges are provided on the upper surface of the rod lens array 5B, similar to the rod lens array 5 of the above described embodiment, and engagement parts E1 and E2 in the form of shoulders are provided on the housing 3. The engagement parts E1 and E2 are engaged with the engagement parts 5c1 and 5c2 of the rod lens array 5b.

Figure 3:
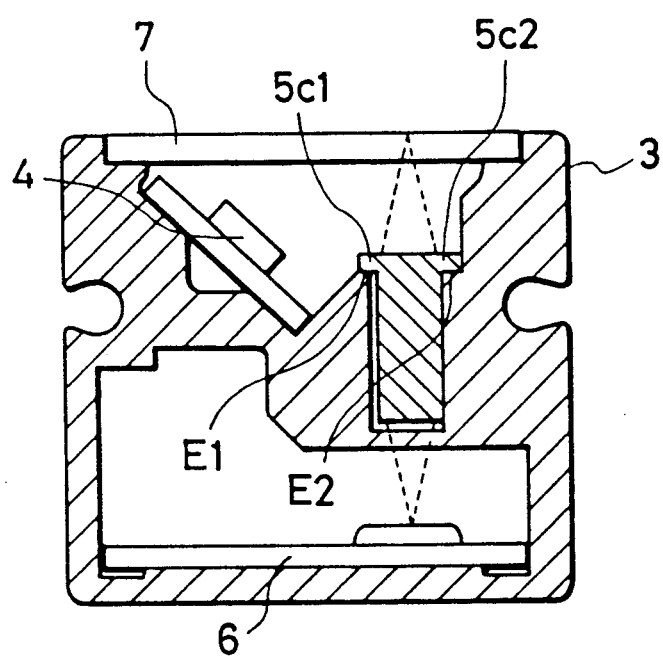
FIG. 3 is a cross sectional view of an image sensor of another embodiment of the invention.

Thus, in both the embodiments of FIG. 1 and FIG. 3, the mechanism for fine positioning for the rod lens array is eliminated, so the number of parts is reduced and the assembly is facilitated.

Moreover, because the rod lenses 12 forming the rod lens array S are made of resin, if the housing 3 is also formed of resin, in addition to the feature of the constant lens height $Z_0$, the rod lens array 5 and the housing 3 can be formed integrally using the same mold. As a result, the cost of the device is lowered, and the assembly and the adjustment of the device are simplified.

Figure 4:
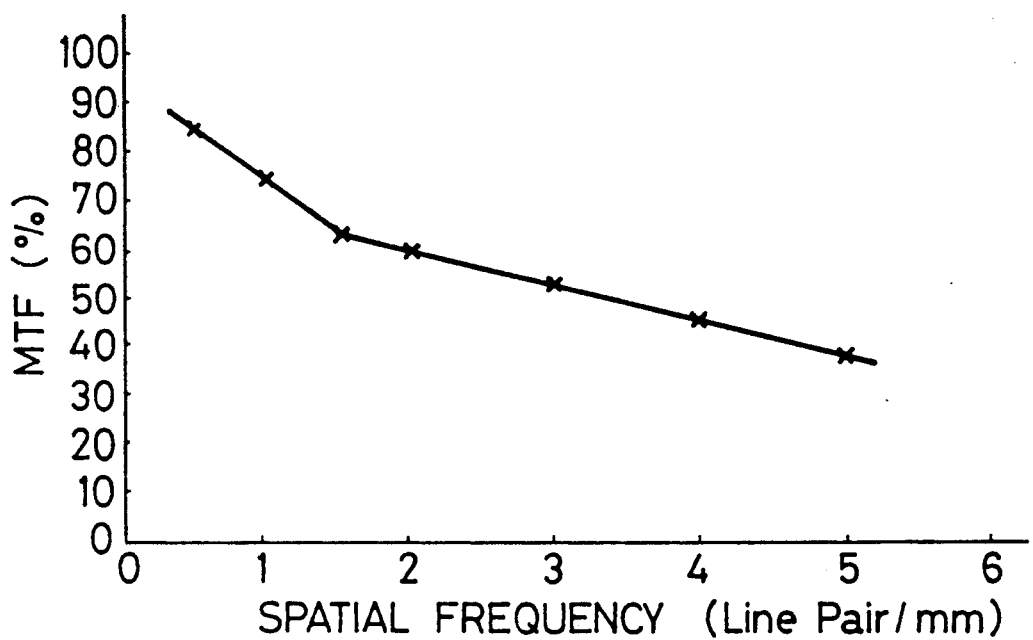
FIG. 4 is a diagram showing the resolution characteristics of the image sensor incorporating the resinous rod lens array according to the invention.
Figure 5:
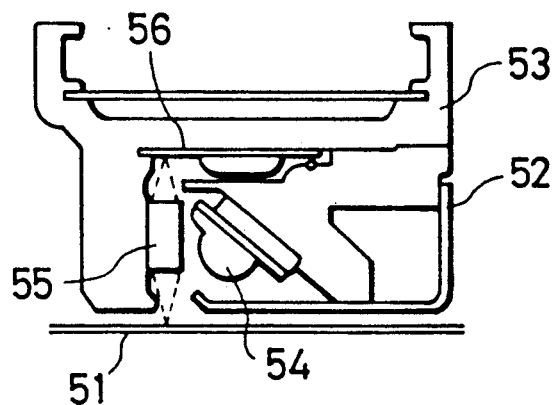
FIG. 5 is a cross sectional view of a conventional image sensor.

When the resinous rod lens array 5 satisfying the relationships (1), (4) and (5) above is mounted in the image sensor of the configuration shown in FIG. 1, and the resolution characteristics, MTF (modulation transfer function) is measured, the characteristics shown in FIG. 4 is obtained. It exhibits the performance that can be used as a reader unit in a telecopier.

In the above embodiment, an image sensor was taken as an example, but the rod lens array of the invention can be applied to any other device having a linear light source, a drive unit and light guide system, and an LED array head.

In summary, an image sensor according to the invention has the following advantages:

(1) The process of fabrication is short because the rod lenses are formed of resin.
(2) The fluctuation in the refraction index gradation coefficient is small because the lenses are formed of two or more polymerizing monomers having different polymerization rate and different refraction indices after the polymerization.
(3) The assembly and the adjustment are easier because the lens positioning mechanism can be eliminated.
(4) The frame and the housing can be formed integrally.
(5) The gap D is no longer required, so it is possible to prevent dust from entering and reaching the sensor board.

What is claimed is:

1. An image sensor comprising:

a rod lens array comprising a plurality of resinous rod lenses arranged in one or more rows and extending in parallel with each other and disposed within a frame;

a linear light source operatively connected to said lenses to transmit light thereto;

a housing accommodating said rod lens array and said linear light source;

wherein with respect to said lens array the following relationships are satisfied:

$$n(r) = n_o(1 - (\tfrac{1}{2})Ar^2)$$

$$0.14 \text{ rad.} \leq n_o r \sqrt{A} \leq 0.42 \text{ rad.}$$

$$0.8 \text{ mm} \leq 2r \leq 1.3 \text{ mm}$$

where r represents the distance from the central axis, n(r) represents the index of refraction at a location separated by r from the central axis $n_o$ represents the index of refraction at the central axis, and $\sqrt{A}$ represents the refraction index gradation coefficient.

2. An image sensor according to claim 1, wherein said frame and said housing are integrally formed of a synthetic resin.

3. An image sensor according to claim 1, wherein said frame and said housing have engagement parts by means of which said frame and said housing are engaged with each other.

4. The image sensor of claim 3 wherein the engagement parts include a groove in the frame and a ridge in the housing for engaging the groove.

5. The image sensor of claim 3 wherein the engagement parts includes flanges on an upper surface of the frame engaging shoulders on the housing so that the frame and housing are engaged with each other.

6. An image sensor comprising:
a rod lens array comprising a plurality of resinous rod lenses arranged in one or more rows and extending in parallel with each other, and disposed within a frame;
a linear light source operatively connected to said lenses to transmit light thereto;
a housing accommodating said rod lens array and said linear light source;
said frame including a groove; and
said housing including a ridge mating with said frame so that said frame and housing are engaged with each other.

7. An image sensor comprising:
a rod lens array comprising a plurality of resinous rod lenses arranged in one or more rows and extending in parallel with each other and disposed within a frame;
a linear light source operatively connected to said lenses to transmit light thereto;
a housing accommodating said rod lens array and said linear light source;
said frame includes flanges on an upper surface of the frame engaging shoulders on the housing and the frame and housing engage each other.

8. An image sensor comprising:
a rod lens array comprising a plurality of polymerized resinous rod lenses arranged in one or more rows and extending in parallel with each other and disposed within a frame;
a linear light source operatively connected to said lenses to transmit light thereto;
a housing accommodating said rod lens array and said linear light source;
each of said rod lenses being composed of at least two polymerizing monomers having different polymerization rates and different refraction indices after polymerization;
wherein with respect to said lens array the following relationships are satisfied:

$$n(r) = n_o(1 - (\tfrac{1}{2})Ar^2)$$

$$0.14 \text{ rad.} \leq n_o r \sqrt{A} \leq 0.42 \text{ rad}$$

$$0.8 mm \leq 2r \leq 1.3 mm$$

where r represents the distance from the central axis n(r) represents the index of refraction at a location separated by r from the central axis, $n_o$ represents the index of refraction at the central axis, and $\sqrt{A}$ represents the refraction index gradation coefficient.

9. The image sensor of claim 8 wherein said housing is formed of the same material as the frame.

10. The image sensor of claim 8 wherein said frame and said housing have egagent parts by means of which said frame and said housing are engaged with each other.

11. The image sensor of claim 10, wherein said engagement parts include a groove in the frame and a ridge on the housing.

12. The image sensor of claim 10 wherein said engagement parts includes flanges on an upper surface of the frame and shoulders on the housing.

13. An image sensor comprising:
a rod lens array comprising a plurality of rod lenses arranged in one or more rows and extending in parallel with each other;
a frame;
said rod lens array being disposed within said frame;
a linear light source operatively connected to said lenses to transmit light thereto; and
a housing accommodating said rod lens array and said linear light source;
said housing having an engagement part;
said frame having an engagement part in engagement with said engagement part of said housing to fixedly position said frame and hence said rod lens array.

14. An image sensor according to claim 13, wherein said engagement part of said housing is in the form of ridge; and
said engagement part of said frame is the form of a groove which is engaged with said ridge.

15. An image sensor according to claim 13, wherein said engagement part of said housing is in the form of shoulder; and
said engagement part of said frame is in the form of a flange which is engaged with said shoulder.

* * * * *